United States Patent
Otani

(10) Patent No.: US 8,300,960 B2
(45) Date of Patent: Oct. 30, 2012

(54) METHOD AND APPARATUS FOR ENCODING VIDEO DATA, METHOD AND APPARATUS FOR DECODING VIDEO DATA, AND PROGRAM RECORDING MEDIUM

(75) Inventor: Minoru Otani, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 12/330,642

(22) Filed: Dec. 9, 2008

(65) Prior Publication Data

US 2009/0169120 A1 Jul. 2, 2009

(30) Foreign Application Priority Data

Dec. 27, 2007 (JP) ................................. 2007-335732

(51) Int. Cl.
*G06K 9/36* (2006.01)
*G06K 9/46* (2006.01)

(52) U.S. Cl. ..................................................... 382/232

(58) Field of Classification Search .................. 382/164, 382/173, 190, 232, 233; 341/59, 67, 106; 348/14.15, E7.079; 375/240.01, 240.23, 375/240.25, 240.26, E07.076
See application file for complete search history.

(56) References Cited

U.S. PATENT DOCUMENTS

| | | | | |
|---|---|---|---|---|
| 5,220,325 A | * | 6/1993 | Ackland et al. | 341/67 |
| 5,541,640 A | * | 7/1996 | Larson | 348/14.15 |
| 7,336,303 B2 | | 2/2008 | Shimomura et al. | |
| 7,920,630 B2 | * | 4/2011 | Bhatia et al. | 375/240.25 |
| 2004/0141553 A1 | | 7/2004 | Bhatia et al. | |
| 2006/0066742 A1 | | 3/2006 | Miyata | |
| 2006/0088098 A1 | * | 4/2006 | Vehvilainen | 375/240.03 |
| 2008/0084925 A1 | * | 4/2008 | Rozen et al. | 375/240.01 |
| 2009/0169120 A1 | * | 7/2009 | Otani | 382/232 |

FOREIGN PATENT DOCUMENTS

| | | |
|---|---|---|
| JP | 11-261933 A | 9/1999 |
| JP | 2003-224868 A | 8/2003 |
| JP | 2004-064334 A | 2/2004 |
| JP | 2006-094145 A | 4/2006 |
| JP | 2006-222612 A | 8/2006 |

OTHER PUBLICATIONS

Office Action established for JP 2007-335732 (Jul. 31, 2012).

\* cited by examiner

*Primary Examiner* — Amir Alavi
(74) *Attorney, Agent, or Firm* — Drinker Biddle & Reath LLP

(57) ABSTRACT

A method and apparatus for encoding video data, a method and apparatus for decoding video data, and a program recording medium are provided. The apparatus for encoding video data includes an encoding processor generating encoded raw image data by encoding raw image data that is output from an image pickup device in frame units; an encoding information generator generating encoding information that is required to decode the encoded raw image data; an image pickup device information generator generating information about an image pickup device and which is required to develop the encoded raw image data; and a data generator generating video data including the encoded raw image data, the encoding information, and the image pickup device information.

12 Claims, 4 Drawing Sheets

METHOD AND APPARATUS FOR ENCODING VIDEO DATA, METHOD AND APPARATUS FOR DECODING VIDEO DATA, AND PROGRAM RECORDING MEDIUM

CROSS-REFERENCE TO RELATED PATENT APPLICATION

This application claims the benefit of Japanese Patent Application No. 2007-335732, filed on Dec. 27, 2007 in the Japanese Intellectual Property Office, the entire contents of which is incorporated herein by reference.

BACKGROUND OF THE INVENTION

1. Field of the Invention

The present invention relates to a method and an apparatus for encoding video data, a method and an apparatus for decoding video data, and a program recording medium. More particularly, the present invention relates to a method and an apparatus for encoding video data, a method and an apparatus for decoding video data, and a program recording medium, which can perform a demosaicing process of raw image data without regard to a format of the raw image data or an update of the format.

2. Description of the Related Art

Video cameras or camcorders that record moving pictures and image pickup apparatuses, such as digital cameras, for example, that record still images generally record data on recording media such as, for example, flash memories, hard disk drives (HDDs), or digital versatile disks (DVDs). This data is recorded on such a recording media after performing a demosaicing process such as an interpolation process on signals output from an image sensor (image pickup device), for example, a charge coupled device (CCD), and compressing the signals in a Moving Picture Experts Group (MPEG)-2 or a Joint Photographic Experts Group (JPEG) format.

When the recorded image data is replayed, the image quality of the image data is degraded since an irreversible compression process was performed on the image data. Therefore, some of the image pickup apparatuses such as the digital still cameras directly record the signals output from the image sensor in a raw data format without performing the demosaicing process or the compression process. Japanese Laid-open Patent No. hei 11-261933 discloses a technology of recording image data after selecting a recording format between either the compressed format, such as JPEG, or the raw image data format.

The raw image data format varies depending on manufacturers of the image pickup apparatuses or the kind of the image pickup apparatuses. Therefore, when the demosaicing process of the raw image data is performed, a developing process needs to be performed using software corresponding to the raw image data format of the manufacturer or the image pickup apparatuses.

In addition, when a parameter or an encoding method of the raw image data format is changed, a formatter installed in the image pickup apparatuses needs to be updated, and the demosaicing software needs to be updated. For example, if the raw image data format is not updated in the demosaicing software even though the raw image data format is updated in the image pickup apparatuses, the demosaicing process of the raw image data recorded by the image pickup apparatuses cannot be performed. In addition, even when a reserved flag is prepared in consideration of future expansions of the raw image data format, the demosaicing software identifies the raw image data as an unrecognizable format, and thus, the demosaicing process of the raw image data cannot be performed based on the extended format.

SUMMARY OF THE INVENTION

The present invention provides a method and apparatus for encoding video data, a method and apparatus for decoding video data, and a program recording medium, which can perform a demosaicing process of raw image data, without regard to a format of the raw image data or an update of the format.

According to an embodiment of the present invention, an apparatus for encoding video data is provided. This apparatus includes: an encoding processor generating encoded raw image data by encoding raw image data that is output from an image pickup device in frame units; an encoding information generator generating encoding information that is required to decode the encoded raw image data; an image pickup device information generator generating information about an image pickup device to develop the encoded raw image data; and a data generator generating video data including the encoded raw image data, the encoding information, and the image pickup device information.

When the encoding information or the image pickup device information is the same as predetermined encoding information or predetermined image pickup device information, the data generator may set a predetermined flag in the video data.

According to another embodiment of the present invention, an apparatus for decoding video data is provided. This apparatus includes: a data reading unit for reading video data including encoded raw image data that is output from an image pickup device in frame units and encoded, encoding information that is required to decode the encoded raw image data, and image pickup device information that is required to develop a raw image data that is decoded; an encoding information extractor extracting the encoding information from the video data; a decoder decoding the encoded raw image data based on the encoding information to generate the raw image data; an image pickup device information extractor extracting the image pickup device information from the video data; and a developer developing the raw image data based on the image pickup device information to generate the image data.

When the video data includes a flag, which is set when the encoding information or the image pickup device information is the same as the predetermined encoding information or predetermined image pickup device information, the decoder may decode the encoded raw image data based on the predetermined encoding information, and the developer may develop the raw image data based on the predetermined image pickup device information.

According to another embodiment of the present invention, a method of encoding video data is provided. The method includes: generating encoded raw image data by encoding raw image data that is output from an image pickup device in frame units; generating encoding information that is required to decode the encoded raw image data; generating image pickup device information that is required to develop the encoded raw image data; and generating video data including the encoded raw image data, the encoding information, and the image pickup device information.

According to another embodiment of the present invention, a method of decoding video data is provided. This method includes: reading video data, which includes encoded raw image data that is output from an image pickup device in frame units and encoded, encoding information that is required to decode the encoded raw image data, and image pickup device information that is required to develop a raw image data that is decoded; extracting the encoding information from the video data; generating the raw image data by decoding the encoded raw image data based on the encoding information; extracting the image pickup device information from the video data; and generating the image data by developing the raw image data based on the image pickup device information.

According to another embodiment of the present invention, a computer readable recording medium is provided. The computer readable recording medium has embodied thereon a computer program for executing functions of: generating encoded raw image data by encoding raw image data that is output from an image pickup apparatus in frame units; generating encoding information that is required to decode the encoded raw image data; generating image pickup device information that is required to develop the encoded raw image data; and generating video data including the encoded raw image data, the encoding information, and the image pickup device information.

According to another embodiment of the present invention, a computer readable recording medium is provided. The computer readable recording medium has embodied thereon a computer program for executing functions of: reading video data, which includes encoded raw image data that is output from an image pickup device in frame units and encoded, encoding information that is required to decode the encoded raw image data, and image pickup device information that is required to develop a raw image data that is decoded; extracting the encoding information from the video data; generating the raw image data by decoding the encoded raw image data based on the encoding information; extracting the image pickup device information from the video data; and generating the image data by developing the raw image data based on the image pickup device information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, structures and operations of a method and an apparatus for encoding video data, a method and an apparatus for decoding video data, and a program recording medium according to the present invention will be described in detail with reference to accompanying drawings.

Image Pickup Apparatus 100

Figure 1:
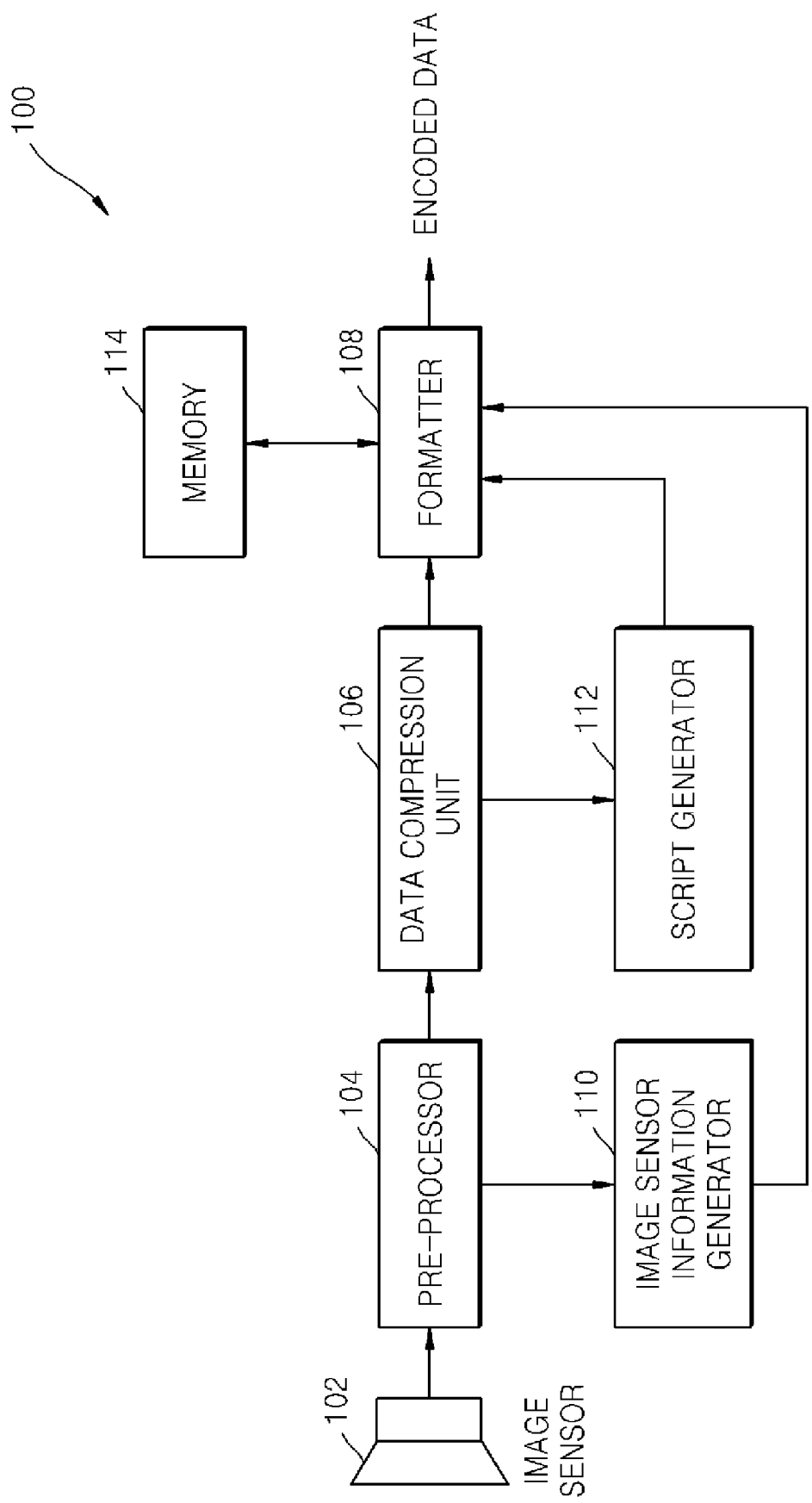
FIG. 1 is a block diagram of an example of an image pickup apparatus according to an embodiment of the present invention.

FIG. 1 is a block diagram of an example of an image pickup apparatus 100 according to an embodiment of the present invention.

The image pickup apparatus 100 includes an apparatus such as a video camera or a camcorder, for example, that can record video using an optical system such as a lens or an image sensor 102, for example. The image pickup apparatus 100 in the example shown in FIG. 1 includes the image sensor 102, a pre-processor 104, a data compression unit 106, a formatter 108, an image sensor information generator 110, a script generator 112, and a memory 114.

The image sensor 102 is an image pickup device, for example, a charge coupled device (CCD) or a complementary metal oxide semiconductor (CMOS), and converts light received from a subject into electric signals and transmits video data to the pre-processor 104 in frame units.

The pre-processor 104 receives the video data transmitted from the image sensor 102, and includes an analog/digital (A/D) converter that converts the received signal into a digital signal. The pre-processor 104 processes the data before compressing the data, for example, by performing a pixel defect compensation. The pre-processor 104 transmits the data generated by the data process (raw image data) to the data compression unit 106. In addition, the pre-processor 104 may output the raw image data that is generated without performing the data processing before the compression process.

The data compression unit 106 is an example of an encoding processor, and compresses the raw image data transmitted from the pre-processor 104. The compression process is a reversible process, that is, the compressed raw image data can be returned to its original status, for example, by performing a Huffman encoding process. In addition, the compression process may use a spatial correlation, which refers to pixels located on upper and lower portions, and left and right portions of the same frame. Accordingly, each frame of the data output from the image sensor 102 can be recorded as each frame is, unlike the MPEG compression method that uses a timing correlation, which refers to other frames in a timing order. The data compression unit 106 generates encoded raw image data by performing the compression process, and transmits the encoded raw image data to the formatter 108.

The data compression unit 106 can perform a packing process, without compressing the raw image data. Hereinafter, the packed raw image data that is not compressed is also referred to as the encoded raw image data.

The formatter 108 is an example of a data generator, and receives the encoded raw image data generated by the data compression unit 106, color filter array (CFA) information (image sensor information) generated by the image sensor information generator 110, and a compression script generated by the script generator 112. In addition, the formatter 108 generates video data (encoded data) including the encoded raw image data, the CFA information, and the compression script. Hereinafter, the CFA information and the compression script are collectively referred to as additional information.

In addition, the formatter 108 compares the previous (set in advance) CFA information and the compression script stored in the memory 114 with the CFA information and the compression script generated by the image sensor information generator 110 or the script generator 112. After that, when the information is the same as each other, the CFA information and the compression script (predetermined flag, for example, 0) read from the memory 114 are written to the video data, and when the information is different from each other, generated CFA information and the compression script are written to the video data. Accordingly, when the image sensor information (for example, CFA information configured in a Bayer pattern) of the image sensor 102, which is set when the format is determined or the product is released, is changed, the generated information of the change is written to the video data. In addition, when the information, which is set when the format is determined or the product is released, is not changed, the CFA information and the compression script or the predetermined flag read from the memory 114 is written to the video data.

The formatter 108 outputs the video data to a media recorder (not shown), and the video data is recorded to a recording medium such as a flash memory or hard disk.

The image sensor information generator 110 is an example of an image pickup device information generator, and generates the image sensor information that is required to develop the raw image data. The image sensor information is information about CFA structure of the image sensor 102. The image sensor information generator 110 transmits the image sensor information to the formatter 108.

The script generator 112 is an example of an encoding information generator, and generates the compression script (encoding information) that is required to decode the encoded raw image data, and is a library function illustrating the compression method. The script generator 112 transmits the compression script to the formatter 108.

The memory 114 stores the image sensor information or the compression script set when the format is determined or the product is released. Accordingly, the formatter 108 may determine whether the additional information generated by the image sensor information generator 110 and the script generator 112 is different from the additional information stored in the memory 114 or not.

The image pickup apparatus 100 of the present embodiment may further include a central processing unit (CPU, not shown). The CPU functions as a calculation processor and a controller with programs, and controls processes performed by the components installed in the image pickup apparatus 100. In addition, a series of processes in the image pickup apparatus 100 can be performed by hardware or software such as a computer program.

The image pickup apparatus 100 of the present embodiment can generate the video data that includes the encoded raw image data, the CFA information, and the compression script, and outputs the generated video data. In addition, a replaying apparatus receiving the video data can perform developing process for the encoded raw image data with reference to the CFA information and the compression script to make the data that can be replayed.

Replaying Apparatus 200

Figure 2:
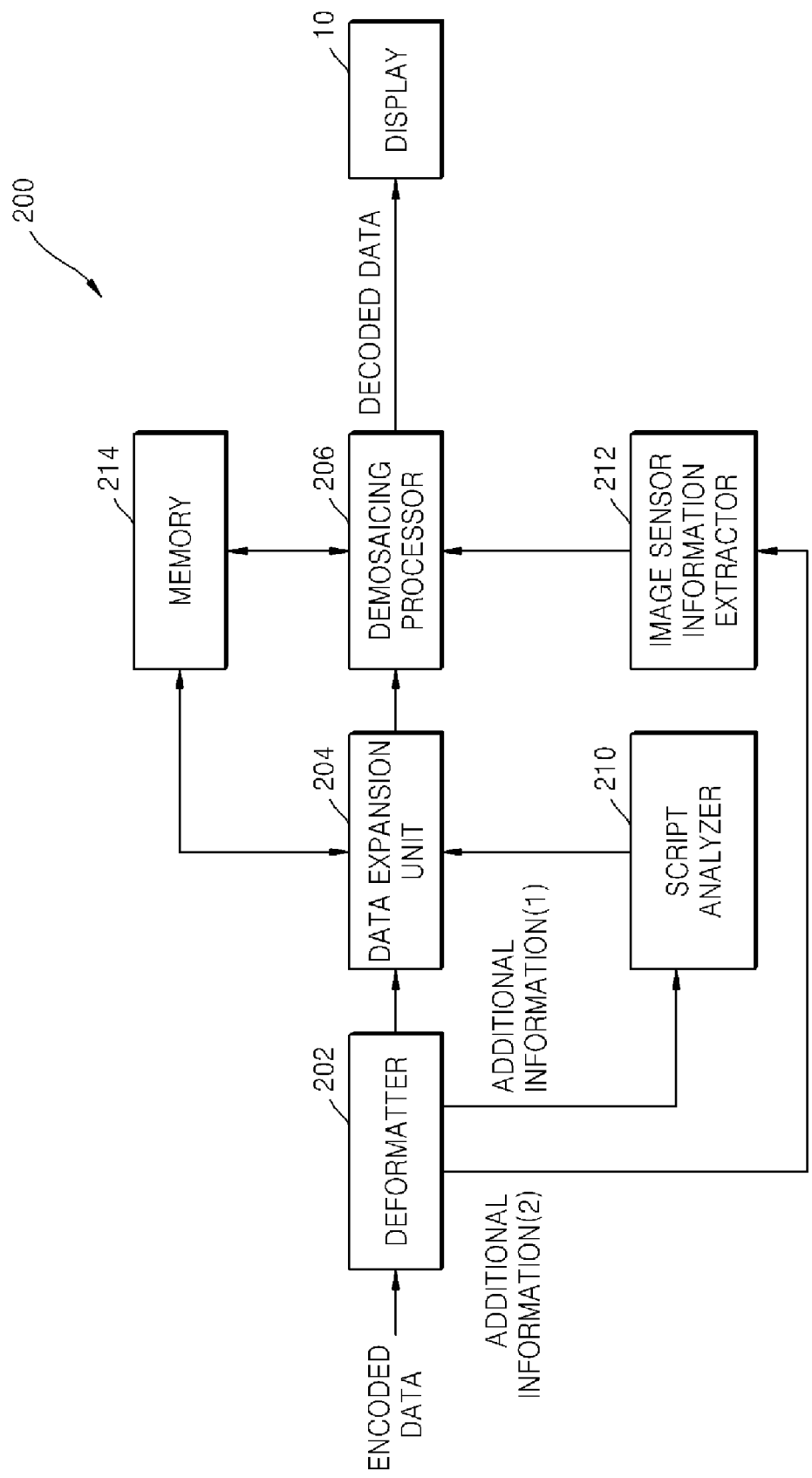
FIG. 2 is a block diagram of an example of a replaying apparatus according to an embodiment of the present invention.

FIG. 2 is a block diagram showing an example of a replaying apparatus 200 according to an embodiment of the present invention. The replaying apparatus 200 will be described as follows with reference to FIG. 2.

The replaying apparatus 200 can replay the video data recorded in the recording medium or the video data received externally. The replaying apparatus 200 may include a deformatter 202, a data expansion unit 204, a demosaicing processor 206, a script analyzer 210, an image sensor information detector 212, and a memory 214.

The deformatter 202 is an example of a data reading unit, and reads the video data (encoded data) that is generated by the image pickup apparatus 100 and recorded in the recording medium. The deformatter 202 divides the video data into the encoded raw image data and the additional information (CFA information and compression script). The deformatter 202 transmits the divided raw image data to the data expansion unit 204, transmits the compression script that is included in the additional information to the script analyzer 210, and transmits the CFA information that is also included in the additional information to the image sensor information extractor 212.

The data expansion unit 204 is an example of a decoding processor, and expands the encoded raw image data transmitted from the deformatter 202 based on the compression script transmitted from the script analyzer 210. In addition, when the script analyzer 210 determines that a flag is predetermined for the compression script, the data expansion unit 204 reads the existing compression script from the memory 214 and expands the encoded raw image data transmitted from the deformatter 202 based on the existing compression script.

The expansion process is a decoding process for recovering the compressed raw image data to its original status, and corresponds to the compression process performed in the image pickup apparatus 100. The data expansion unit 204 generates the raw image data, which is not compressed, by performing the expansion process, and transmits the raw image data to the demosaicing processor 206. In addition, when the encoded raw image data is not compressed, but packed, the data expansion unit 204 performs a de-packing process.

The demosaicing processor 206 is an example of a developing processor, and performs the demosaicing process on the raw image data transmitted from the data expansion unit 204 based on the CFA information transmitted from the image sensor information extractor 212. In addition, when the image sensor information extractor 212 determines that the a flag is predetermined for the image sensor information, the demosaicing processor 206 reads the predetermined image sensor information from the memory 214 and performs the demosaicing process on the raw image data transmitted from the data expansion unit 204 based on the existing CFA information.

The demosaicing process may include an interpolation process for interpolating a complete image using incomplete raw image data. The demosaicing processor 206 generates data (decoded data) that is developed by the demosaicing process. The developed data can be replayed on a display 10, that is, the developed data is transmitted to the display 10 through a video output unit (not shown) to display the video on the display 10.

The script analyzer 210 is an example of an encoding information extractor, and receives the compression script that is divided and extracted from the video data by the deformatter 202. The script analyzer 210 analyzes the compression script to send analyzed data to the data expansion unit 204. In addition, when the script analyzer 210 determines that a flag is predetermined for the compression script, the script analyzer 210 notifies the data expansion unit 204 of such a determination result.

The image sensor information extractor 212 is an example of an image pickup device information extractor, and receives the image sensor information that is divided and extracted from the video data by the deformatter 202. The image sensor information extractor 212 transmits the image sensor information, such as the CFA configuration of the image sensor, to the demosaicing processor 206. In addition, when the image sensor information extractor 212 determines that a flag is predetermined for the image sensor information, the image sensor information extractor 212 notifies the demosaicing processor 206 of such a determination result.

The memory 214 stores the image sensor information or the compression script that is set in advance when the format is determined or the product is released. Accordingly, the data expansion unit 204 or the demosaicing processor 206 can receive the predetermined CFA information and the compression script from the memory 214, when it is determined that a flag is predetermined for the CFA information and the compression script. In addition, the demosaicing processor 206 performs the expansion process or the demosaicing process based on the predetermined CFA information and the compression script.

In addition, the replaying apparatus 200 may include a CPU (not shown). The CPU functions as a calculation processor and a controller according to a program, and controls the components installed in the replaying apparatus 200. A series of processes of the replaying apparatus 200 can be performed using hardware or software such as a computer program.

According to the present embodiment, the replaying apparatus 200 receives the video data including the encoded raw image data, the image sensor information, and the compression script generated by the image pickup apparatus 100, and can perform a developing process of the encoded raw image data to make data that can be replayed with reference to the image sensor information and the compression script.

Data Structure of the Video Data

Figure 3:
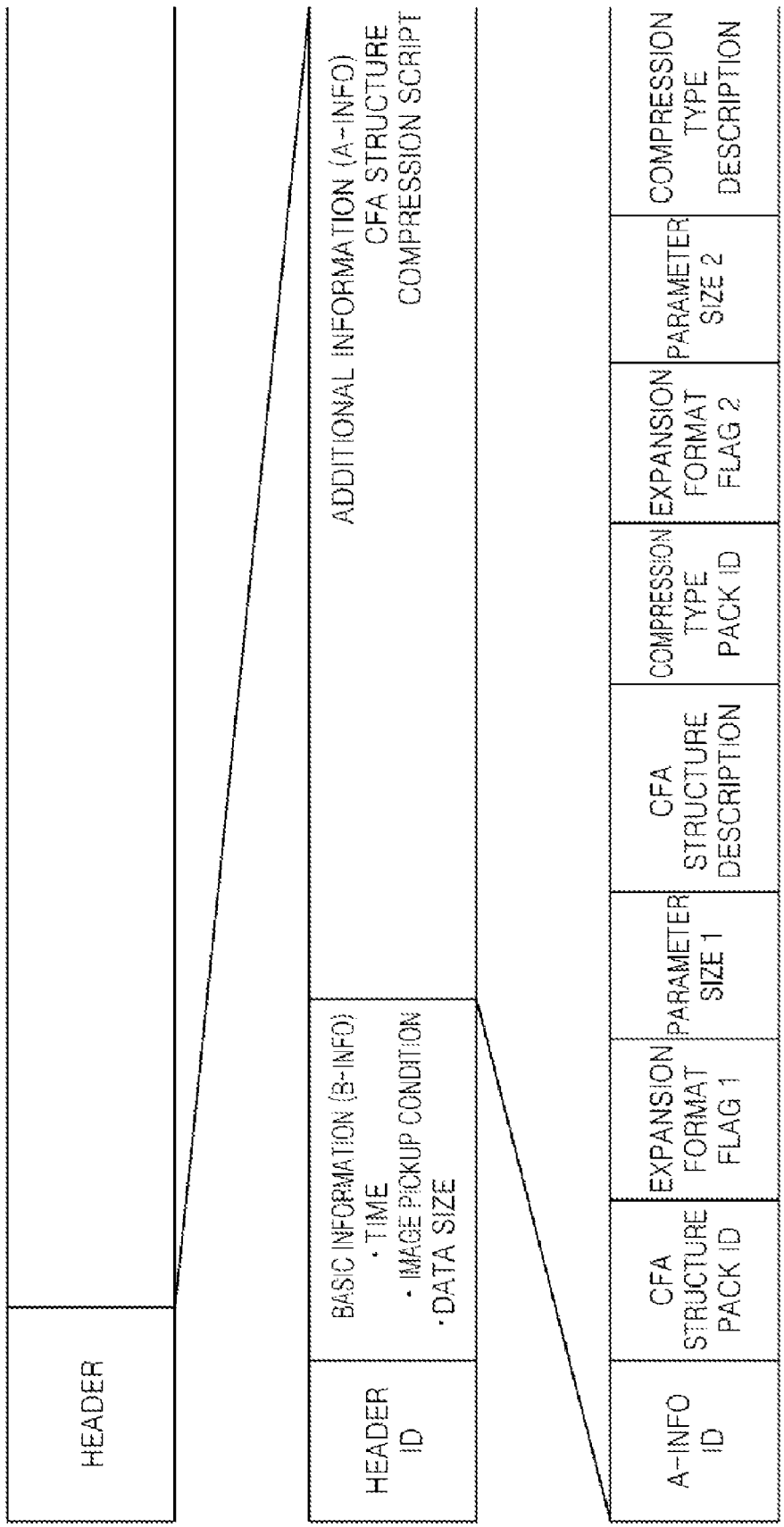
FIG. 3 is a diagram illustrating an example of a configuration of video data that is generated by the image pickup apparatus of FIG. 1 and read by the replaying apparatus of FIG. 2.
Figure 4:
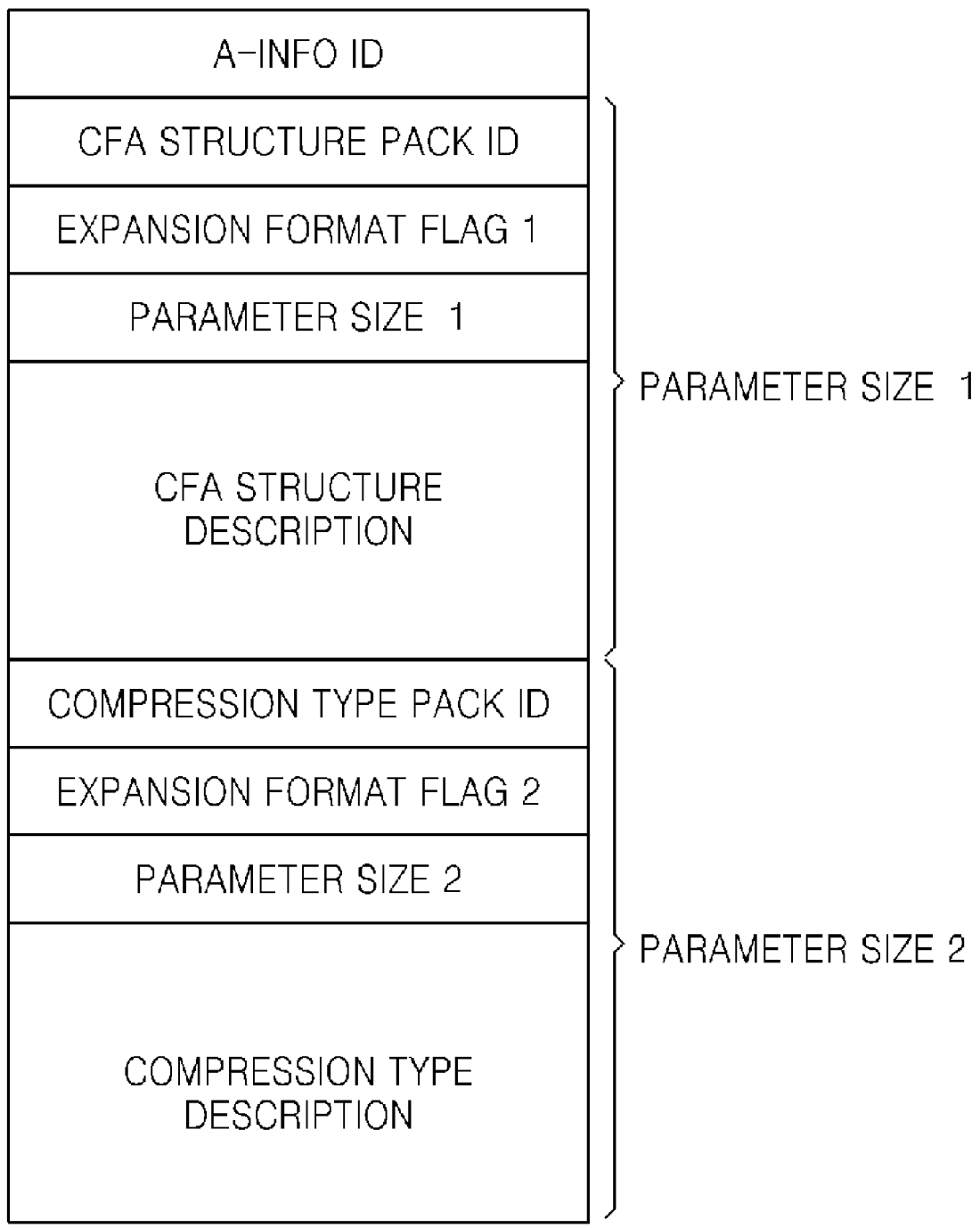
FIG. 4 is a diagram illustrating an example of a configuration of video data that is generated by the image pickup apparatus of FIG. 1 and read by the replaying apparatus of FIG. 2.

FIG. 3 is a diagram illustrating an example of a configuration of video data that is generated by the image pickup apparatus of FIG. 1 and read by the replaying apparatus of FIG. 2. FIG. 4 is a diagram illustrating an example of a configuration of video data that is generated by the image pickup apparatus of FIG. 1 and read by the replaying apparatus of FIG. 2.

FIGS. 3 and 4 are diagrams illustrating a data structure of the video data that is generated by the image pickup apparatus 100 of FIG. 1 and read by the replaying apparatus 200 of FIG. 2.

As shown in the example of FIG. 3, the video data includes a header followed by the encoded raw image data that includes at least one frame of image data.

The header includes a header ID, basic information (B-INFO) next to the header ID, and additional information (A-INFO) next to the basic information. The basic information (B-INFO) includes information, such as photographing condition, photographing time, and data size, that are required to process data in the image pickup apparatus 100 or the replaying apparatus 200.

The additional information (A-INFO) includes the CFA information and the compression script. The additional information (A-INFO) includes an A-INFO ID, a CFA structure PACK ID, Expansion Format Flag 1, Parameter Size 1, a CFA structure description, a compression type PACK ID, an Expansion Format Flag 2, a Parameter Size 2, and a compression type description regarding a compression method technology, and they are arranged in the above order, for example. That is, the series of data from CFA structure pack ID to the contents of data is included in each of the CFA information and the compression script.

The A-INFO ID, the CFA structure PACK ID, and the compression type PACK ID are identification portions representing the following data. The expansion format flags 1 and 2 denote whether the image sensor information such as CFA structure or the compression script is an expansion type or not. Here, the expansion type means that the format of the CFA information or the compression script is different from the format set when the format is determined or the product is released. The parameter sizes 1 and 2 denote the data size of the additional information, and each includes the size of data from the PACK ID portion to the contents portion so as to clarify the position of next data.

In the sections of the CFA structure description and the compression type description, detailed contents of the additional information are described. That is, if the CFA information and the compression script are of the expanded type (for example, the formats of the CFA information and the compression script are not changed from the time when the format is set or the product is released), predetermined flags are disposed in the sections of the CFA structure description and the compression type description. On the other hand, if the CFA information and the compression script are not in the format that is determined when the format is set or the product is released (extended format), changed information, for example, the CFA information is disposed in the section of the CFA structure description and the compression script is disposed in the section of the compression type description.

The predetermined flag written to the section of the CFA structure description may include a color of the color filter (CF), vertical and horizontal scan frequency, the number of pixels, and the number of lines. The predetermined flag written to the compression type description may include a Huffman table, information regarding the performing of a differentiation as a pre-process, and whether the differentiation is performed in a forward and backward direction or in an upward and downward direction. On the other hand, the compression script is described in a format that can be read by the replaying apparatus 200 using a library function. Here, the reading result corresponding to a library function is input into the replaying apparatus 200.

According to the present embodiment, the image pickup apparatus 100 generates the video data, which includes the encoded raw image data and the CFA information or the compression script. Accordingly, the replaying apparatus 200 can decode the video data of an updated format or other formats in addition to the video data of the predetermined format. For example, even when the image pickup apparatus 100 encodes the video data using an encoding method that could not be considered when the format was set, the replaying apparatus 200 does not have to update the format. In addition, the image pickup apparatus 100 can use an encoding method that is self-made by a user.

According to the method and apparatus for encoding the video data, the method and apparatus for decoding the video data, and the program recording medium of the present invention, the demosaicing of the raw image data can be easily performed, without regard to the format of the raw image data or the update of the format.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for encoding video data, the apparatus comprising:
   an encoding processor to generate encoded raw image data by encoding raw image data that is output from an image pickup device in frame units;
   an encoding information generator to generate encoding information that is required to decode the encoded raw image data;
   an image pickup device information generator to obtain information about the image pickup device needed to develop the raw image data, wherein the raw image data that is encoded was not developed according to the image pickup device information; and a data generator to generate the video data including the encoded raw image data, the encoding information, and the image pickup device information.

2. The apparatus of claim 1, wherein, when the encoding information or the image pickup device information is the same as predetermined encoding information or predetermined image pickup device information, respectively, the data generator sets a predetermined flag in the video data.

3. The apparatus of claim 1, wherein the information about the image pickup device information comprises color filter array information useable to develop the raw image data by demosaicing the raw image data output by the image pickup device.

4. The apparatus of claim 1, further comprising a programmable processor programmed to implement at least one of the encoding processor, the encoding information generator, the image pickup device information generator, or the data generator.

5. An apparatus for decoding video data, the apparatus comprising:
 a data reading unit to read the video data including raw image data that is output from an image pickup device in frame units and encoded, encoding information that is required to decode the encoded raw image data, and image pickup device information that is required to develop the raw image data;
 an encoding information extractor to extract the encoding information from the video data;
 a decoder to decode the encoded raw image data based on the encoding information to generate the raw image data;
 an image pickup device information extractor to extract the image pickup device information from the video data, wherein the extracted raw image data was not developed according to the image pickup device information; and
 a developer to develop the raw image data based on the image pickup device information to generate image data.

6. The apparatus of claim 5, wherein, when the video data includes a flag, which is set when the encoding information or the image pickup device information is the same as predetermined encoding information or predetermined image pickup device information, respectively, the decoder decodes the encoded raw image data based on the predetermined encoding information, and develops the raw image data based on the predetermined image pickup device information.

7. The apparatus of claim 5, wherein the information about the image pickup device information comprises color filter array information, and the developer is to generate the image data by demosaicing the extracted raw image data based on the color filter array information.

8. The apparatus of claim 5, further comprising a programmable processor programmed to implement at least one of the data reading unit, the encoding information extractor, the decoder, the image pickup device information extra, or the developer.

9. A method of encoding video data, the method comprising:
 generating encoded raw image data by encoding raw image data that is output from an image pickup device in frame units;
 generating encoding information that is required to decode the encoded raw image data;
 obtaining image pickup device information that is required to develop the raw image data, wherein the raw image data that is encoded was not developed according to the image pickup device information; and
 generating the video data including the encoded raw image data, the encoding information, and the image pickup device information.

10. A method of decoding video data, the method comprising:
 reading the video data, which includes raw image data that is output from an image pickup device in frame units and encoded, encoding information that is required to decode the encoded raw image data, and image pickup device information that is required to develop the raw image data;
 extracting the encoding information from the video data;
 generating the raw image data by decoding the encoded raw image data based on the encoding information;
 extracting the image pickup device information from the video data, wherein the extracted raw image data was not developed according to the image pickup device information; and
 generating image data by developing the raw image data based on the image pickup device information.

11. A non-transitory computer readable storage medium having instructions embodied thereon that, when executed, cause a machine to at least:
 generate encoded raw image data by encoding raw image data that is output from an image pickup apparatus in frame units;
 generate encoding information that is required to decode the encoded raw image data;
 obtain image pickup device information that is required to develop the raw image data, wherein the raw image data that is encoded was not developed according to the image pickup device information; and
 generate video data including the encoded raw image data, the encoding information, and the image pickup device information.

12. A non-transitory computer readable storage medium having instructions embodied thereon that, when executed, cause a machine to at least:
 read video data, which includes raw image data that is output from an image pickup device in frame units and encoded, encoding information that is required to decode the encoded raw image data, and image pickup device information that is required to develop the raw image data;
 extract the encoding information from the video data;
 generate the raw image data by decoding the encoded raw image data based on the encoding information;
 extract the image pickup device information from the video data, wherein the extracted raw image data was not developed according to the image pickup device information; and
 generate image data by developing the raw image data based on the image pickup device information.

* * * * *